US00RE36867E

United States Patent [19]

Rozzano

[11] E Patent Number: Re. 36,867

[45] **Reissued Date of Patent: *Sep. 12, 2000**

[54] COMPARTMENTALIZED FOOD PACKAGE

[75] Inventor: Michael J. Rozzano, West Bloomfield, Mich.

[73] Assignee: IBP Foods, Inc., Dakota Dunes, S. Dak.

[ * ] Notice: This patent is subject to a terminal disclaimer.

[21] Appl. No.: 09/023,585

[22] Filed: Feb. 13, 1998

Related U.S. Patent Documents

Reissue of:

[64] Patent No.: 5,695,798
Issued: Dec. 9, 1997
Appl. No.: 08/608,278
Filed: Feb. 28, 1996

[51] Int. Cl.[7] ..... B65D 1/36; B65D 21/032; B65D 43/03

[52] U.S. Cl. ..... 426/87; 426/115; 426/119; 426/120; 426/123; 206/459.5; 206/518; 206/557; 206/561

[58] Field of Search ..... 426/87, 112, 115, 426/119, 120, 123; 206/459.5, 518, 551, 561

[56] References Cited

U.S. PATENT DOCUMENTS

| | | | |
|---|---|---|---|
| D. 224,585 | 8/1972 | Jewel | D9/341 |
| D. 224,586 | 8/1972 | Jewel | D9/341 |
| D. 305,204 | 12/1989 | Reifein et al. | D9/418 |
| D. 305,205 | 12/1989 | Grindrod et al. | D9/418 |
| 2,965,501 | 12/1960 | Harriss | 426/120 |
| 3,037,677 | 6/1962 | Debs | 229/5.6 |
| 3,115,245 | 12/1963 | Schechter | 220/279 |
| 3,292,810 | 12/1966 | Schechter | 220/4.24 |
| 3,401,863 | 9/1968 | Earl | 229/406 |
| 3,487,915 | 1/1970 | Scott | 206/461 |
| 3,903,309 | 9/1975 | Mahaffy et al. | 426/129 |
| 3,933,296 | 1/1976 | Ruskin et al. | 229/406 |
| 4,202,464 | 5/1980 | Moh et al. | 220/339 |
| 4,346,833 | 8/1982 | Bernhardt | 229/257 |
| 4,351,473 | 9/1982 | Manizza | 229/123.2 |
| 4,355,721 | 10/1982 | Knott, II et al. | 206/524.2 |
| 4,355,755 | 10/1982 | Faller | 229/406 |
| 4,382,513 | 5/1983 | Schirmer et al. | 206/484 |
| 4,522,301 | 6/1985 | Ajmera | 206/507 |
| 4,531,668 | 7/1985 | Forbes et al. | 229/123.2 |
| 4,537,305 | 8/1985 | Takanashi | 206/438 |
| 4,570,818 | 2/1986 | Borst et al. | 220/835 |
| 4,702,368 | 10/1987 | Jones | 206/45.24 |
| 4,781,289 | 11/1988 | Perkins | 206/45.24 |
| 4,961,494 | 10/1990 | Alexander | 206/45.2 |
| 4,962,849 | 10/1990 | Anderson | 206/45.24 |
| 5,011,006 | 4/1991 | Anderson | 206/45.24 |
| 5,012,928 | 5/1991 | Proffitt et al. | 206/508 |
| 5,119,940 | 6/1992 | Grindrod | 426/120 |
| 5,277,329 | 1/1994 | Pomroy et al. | 220/526 |
| 5,375,701 | 12/1994 | Hustad et al. | 206/542 |
| 5,381,901 | 1/1995 | Hudley | 206/457 |

FOREIGN PATENT DOCUMENTS

3110847 A1 9/1982 Germany .

*Primary Examiner*—Leo B. Tentoni
*Attorney, Agent, or Firm*—Herzog, Crebs & McGhee, LLP; Mark E. Stallion

[57] ABSTRACT

A compartmentalized plastic food package includes a container and sealed cover which have a plurality of individually sealed chambers for distinct foodstuffs. The container includes a top flange or surface which extends about the individual chambers onto which the removable cover is secured by an adhesive or heat sealing. The top flange includes a peripheral shoulder and lip which cooperates with the rear or bottom edge of certain of the chambers to facilitate substantially upright self-display of the container and contents. The sidewalls of the chambers are tapered and include notched or stepped spacers such that the containers may be controllably nested, the spacers preventing overly tight nesting and thus facilitating separation prior to filling and sealing. A plurality of distinct foodstuffs such as meat, cheese, crackers and cookies, for example, may be individually sealed in the chambers, thereby maintaining each foods flavor, aroma and desired moisture content.

33 Claims, 3 Drawing Sheets

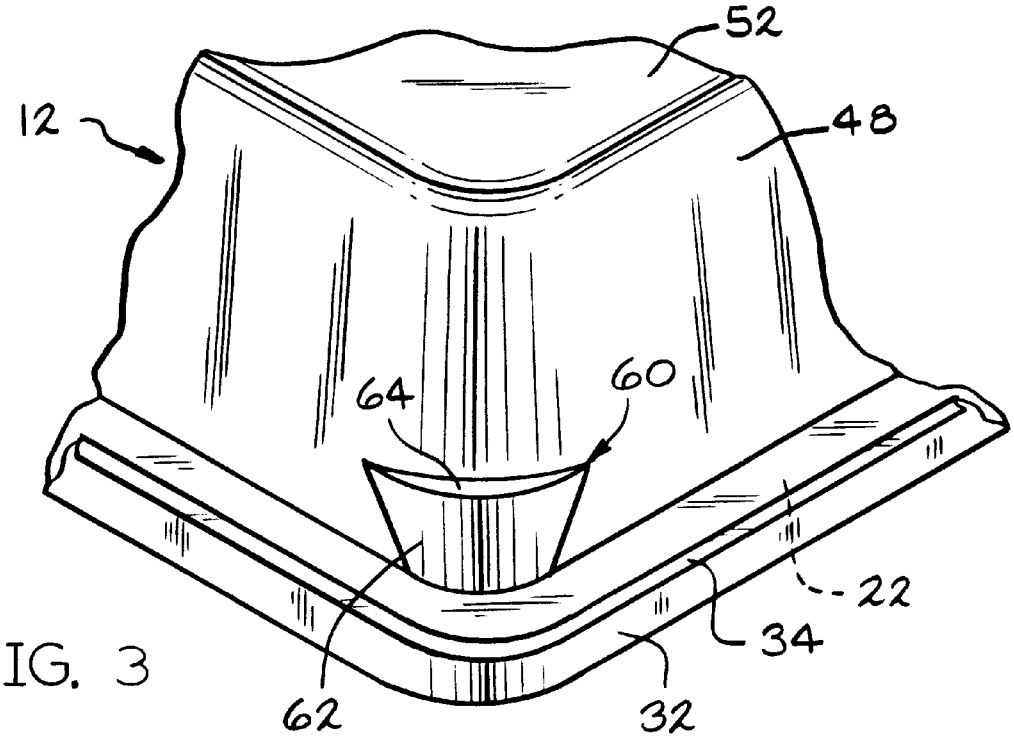
FIG. 3
FIG. 4
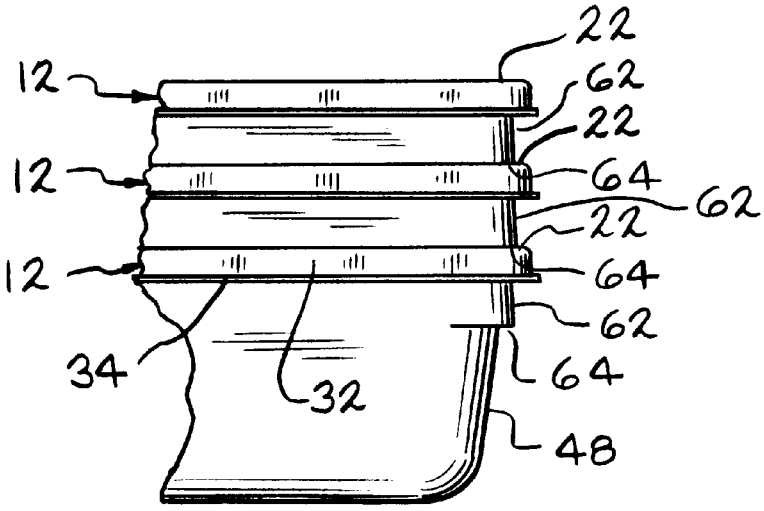

COMPARTMENTALIZED FOOD PACKAGE

Matter enclosed in heavy brackets [ ] appears in the original patent but forms no part of this reissue specification; matter printed in italics indicates the additions made by reissue.

BACKGROUND OF THE INVENTION

The invention generally relates to multi-chamber food packages and more specifically to a multi-chamber or compartmentalized food package which is both nestable in its unfilled state and self-displaying when filled and sealed.

While the diversity of snack foods increases on an almost daily basis, over the long term, such foods reflect the consumers' desire for quickly and readily available sustenance and currently reflect their demand for healthier foods, i.e., foods low in calories, fats and cholesterol. Manufacturer's have responded with a wide variety of products satisfying these demands.

In addition to the constantly changing demands for foodstuffs themselves, a second trend of the snack food market relates to packaging for the products. Single serving packages which provide average or typically sized servings of a food or snack are increasingly popular. These packages not only remain sealed until just prior to consumption thereby eliminating sanitation concerns but also avoid all problems associated with leftovers, i.e., storage and all too frequently spoilage and waste of the food product because there are no leftovers. Such single serving packaging, once confined almost exclusively to milk cartons, now includes other dairy products, salads, entrees, cookies, crackers, fruit and the like.

A confluence of these two food industry trends has resulted in single serving snacks or meals which include a variety of foodstuffs. For example, foods compatible from a storage temperature standpoint such as meat and cheese may be combined in one package with other less storage temperature sensitive snacks such as cookies, crackers or candy. For example, U.S. Pat. No. 5,237,329 to Pomroy et al. and U.S. Pat. No. 5,381,901 to Hundley teach compartmentalized food containers intended for accepting two or more distinct foodstuffs.

A feature of food containers which is looked upon favorably by vendors and appreciated by customers relates to display of such packages. It is well known to include a flange or flap along the upper edge of the package into which an aperture is formed so that the package may be hung on horizontal rods of a display rack. Alternatively, a hook or similar open shape may be formed in a flap which also facilitates hanging display. Aside from the additional manufacturing steps necessary to produce an aperture or hook in a flange or flap of a package, such packaging necessitates specialized display equipment in a store or refrigeration case having plural oblique or horizontal rods for receiving the packages. Furthermore, if the product is not balanced within the package relative to the hang point, the package will hang at an angle. Such skewed disposition is generally considered to be unattractive and therefore undesirable.

One solution to the foregoing problem has been to fabricate the package in a manner which facilitates self-display, that is, vertical or substantially vertical storage and display, on a shelf or other horizontal surface. U.S. Pat. No. 3,037,677 to Debs teaches a metal foil package wherein one lip or edge may be arranged to provide a suitable base area so that the package will stand upright without other support to display the package. Such vertical display is also achieved in the package disclosed in U.S. Pat. No. 5,119,940 to Grindrod. This patent discloses a multi-compartment plastic package having a stiff collar which completely encircles the package and enables it to stand on one edge. A similar package is disclosed in U.S. Pat. No. 5,375,701 to Hustad et al. In this patent, a multi-compartment package includes a stiff flap secured to the bottom of the package which, in cooperation with the front lip of the package, maintains it in an upright position. Clearly, the packages in the above two patents require additional components to maintain them in an upright, display position which is undesirable.

From the foregoing, it is apparent that improvements in the art of self-standing, multi-compartment food packages are desirable and would have significant utility.

SUMMARY OF THE INVENTION

A compartmentalized, plastic food package includes a container and sealed cover which have a plurality of individually sealed chambers for foodstuffs. The container includes a top flange or surface which extends about the individual chambers onto which the removable cover is secured by an adhesive or heat sealing. The top flange includes a peripheral shoulder and lip which cooperates with the rear or bottom edge of certain of the chambers to facilitate substantially upright self-display of the container and contents. The sidewalls of the chambers are tapered and include notched or stepped spacers such that the containers may be controllably nested, the spacers preventing overly tight nesting and thus facilitating separation prior to filling and sealing.

A plurality of distinct foodstuffs such as meat, cheese, nuts, crackers, fruit, cookies and candy, for example, may be individually sealed in the chambers, thereby maintaining each foods flavor, aroma and desired moisture content. Preferably, the heavier foodstuffs, e.g., meat and cheese, are disposed in the lower chambers when the container is oriented in a vertical (display) position and the lighter foodstuffs, e.g., crackers and cookies, are disposed in the upper chambers to improve stability in this position.

It is thus an object of the present invention to provide a compartmentalized food package which is self-storing and self-displaying in a vertical orientation.

It is a further object of the present invention to provide a compartmentalized food package wherein diverse foodstuffs may be stored in isolated fashion from one another.

It is a still further object of the present invention to provide a compartmentalized food container which is nestable and includes spacers which facilitate ready separation for filling.

It is a still further object of the present invention to provide a compartmentalized food container having a cover which may removably secured by an adhesive or heat sealing.

It is a still further object of the present invention to provide a compartmentalized food package wherein the heavier foodstuffs, e.g., meat and cheese are disposed in bottom chambers and lighter foodstuffs, e.g., crackers and cookies, are disposed in the upper chambers to improve, vertical, i.e., standing, self-standing stability.

Further objects and advantages of the present invention will become apparent by reference to the following description of the preferred embodiment and appended drawings wherein like reference numerals refer to the same element, feature or component.

BRIEF DESCRIPTION OF THE DRAWINGS

FIG. 3 is an enlarged, fragmentary perspective view of a corner of a compartmentalized food container according to the present invention;

FIG. 4 is a fragmentary, elevational view of a plurality of nested, compartmentalized food containers according to the present invention;

DESCRIPTION OF THE PREFERRED EMBODIMENTS

Figure 1:
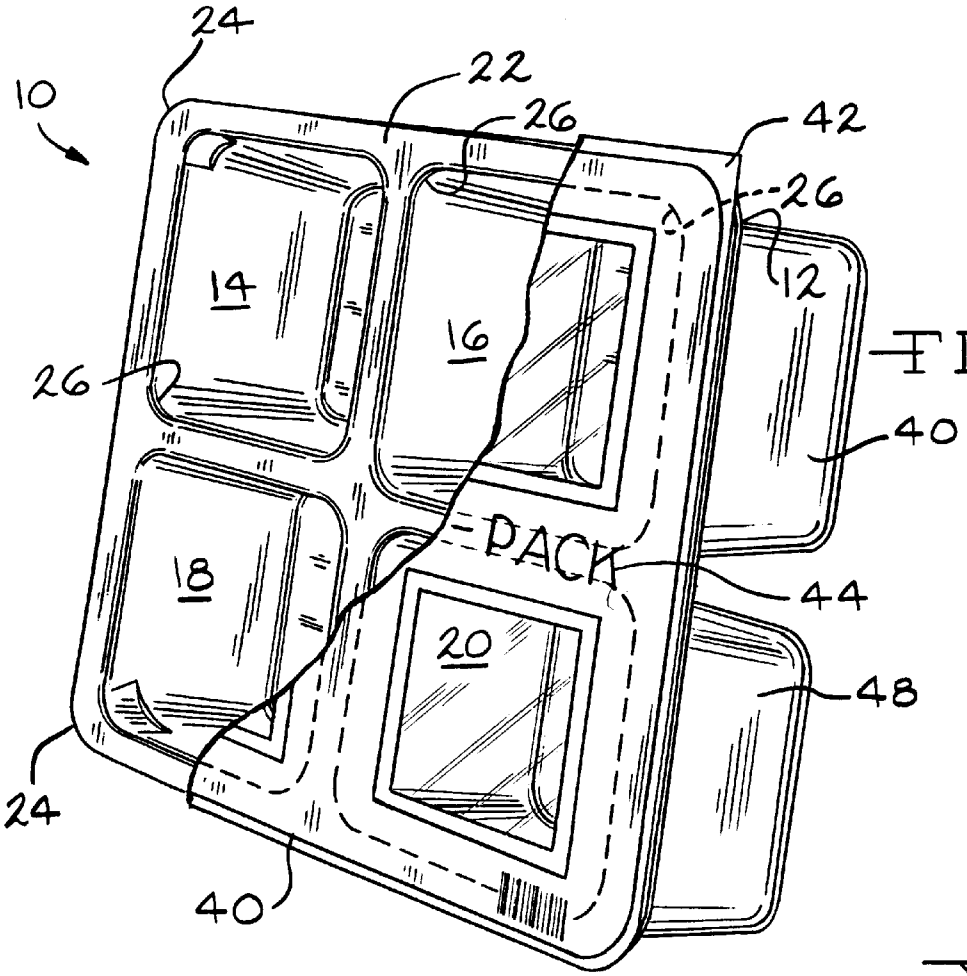
FIG. 1 is a perspective view of a compartmentalized food package according to the present invention with a portion of the sealing cover broken away.

Referring now to FIG. 1, a compartmentalized food package is illustrated and generally designated by the reference numeral 10. The compartmentalized food package 10 includes a base or container portion 12 which defines a plurality, preferably four, compartments or chambers 14, 16, 18 and 20. Each of the compartments or chambers 14, 16, 18 and 20 defines an individual volume of a preselected size have mouths or openings coplanar with a front flange 22 which extends about the periphery of the container 12 as well as between adjacent edges of the individual compartments or chambers 14, 16, 18 and 20. The front flange 22 has a substantially uniform width about the periphery of the container 12 as well as between the adjacent compartments 14, 16, 18 and 20 and lies in a single plane. The front flange 22 further defines curved exterior corners 24 and filleted interior corners 26.

Disposed about the periphery of the front flange 22 is a downturned shoulder on edge 32. As used herein "down-turned" refers to an edge which extends away from the flange [32] *22* and, when the container 12 is conventionally disposed on a horizontal surface with its front flange 22 up, the edge 32 extends downwardly therefrom. Adjacent the portion of the down-turned shoulder or edge 32 most distant the front flange 22 is a narrow, outwardly extending lip 34. The downturned edge 32 is preferably disposed normal to the surface of the front flange 22 and the lip 34. Thus, the lip 34 and the front flange 22 are preferably parallel to one another. The container 12 is preferably fabricated of high density polyethylene (HDPE) or a similar recyclable polymer or plastic and defines a nominal thickness of between about 0.009 inches and 0.012 inches (0.23 mm to 0.30 mm) given nominal overall container size of 5 to 6 inches (127 mm to 152.4 mm) square and 1 to 1.5 inches (25.4 mm to 38.1 mm) in depth. Larger containers 12 will preferably be fabricated of thicker material to increase the strength as needed.

The package 10 also includes a flexible, thin plastic front cover 40 disposed across the front of the container 12 and secured to the surface of the front flange 22 by a thin layer or bead of adhesive (not illustrated) or by appropriate melting and sealing of the front cover 40 to the container 12. When the front cover 40 is sealed in place on the flange 22, the individual chambers 14, 16, 18 and 20 are isolated from one another such that foodstuffs disposed therein will maintain their individual aromas, tastes and moisture contents. In order to render removal of the front cover 40 from the container 12 convenient, it preferably includes a small projecting tab 42 at one corner or along one edge which facilitates gripping by the fingers of a user and removal from the container 12 as will be readily appreciated. The front cover 40 may also include various indicia 44 or artwork such as brand name or content designations or a UPC bar code. The front cover 40 is relatively flexible and is preferably fabricated of polyethylene having a thickness from about 0.007 inches to 0.009 inches (0.18 mm to 0.23 mm).

Figure 2:
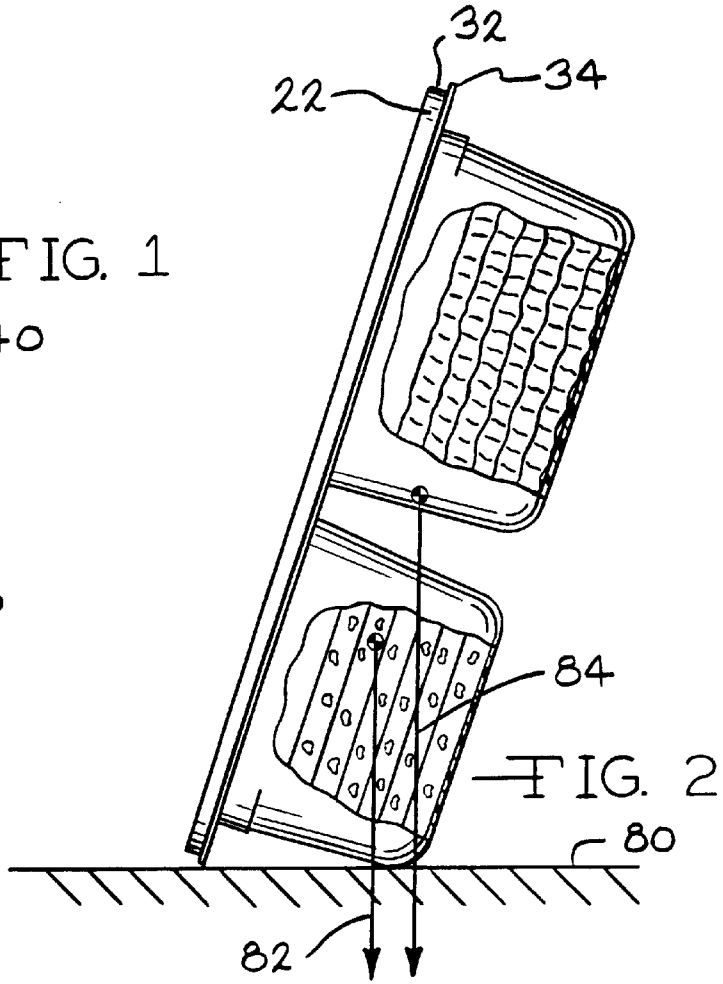
FIG. 2 is a side elevational view of a compartmentalized food container according to the present invention illustrating the locations of two centers of gravity.

Referring now to FIGS. 1, 2 and 3, it will be appreciated that each of the compartments or chambers 14, 16, 18 and 20 are defined by oblique sidewalls 48. The corners of the chambers 14, 16, 18 and 20 are curved and generally correspond to or mimic the filleted interior corners 26. Each of the sidewalls 48 is oriented at a large acute angle to the plane defined by the front flange 22, such angle being approximately 85 to 88 and preferably about 86.5. The oblique sidewalls 48 merge with bottom panels [50] *52* which cooperatively define the chambers 14, 16, 18 and 20.

The oblique sidewalls 48 readily facilitate nesting of the empty packages 12 as illustrated in FIG. 4. Intimate nesting of such packages 12, that is, nesting wherein the upper surfaces of the bottom panels [50] *52* contacts the lower or outer surfaces of the bottom panels [50] *52* of the package nested therein, while providing maximum packaging or nesting density, often create difficulty when the packages are being separated just prior to filling because such separation is typically done by machine and if the bottom panels [50] *52* of the packages are in contact this likely means that the edges where a separating mechanism will function are likewise in contact making such separation difficult and resulting in occasional double packages passing through the packing machine. Such double packages are both wasteful and time consuming to detect and remove.

The present invention addresses this problem and incorporate a plurality of notch-like spacers or separators 60, one of which is preferably disposed at each corner of the container 12. The spacers 60 include an arcuate and trapezoidal wall portion 62 which extends substantially normal to the plane of the front flange 22 and a crescent shaped surface 64 which extends between the lower edge of the trapezoidal wall portion 62 and the sidewalls 48, forming a narrow ledge which, when the packages 12 are nested, aligns with and abuts a portion of the front flange 22 adjacent the filleted peripheral corners 26. The height of the arcuate trapezoidal wall 62 thus defines the spacing between adjacent, nested containers 12 and is on the order of 0.25 inches to 0.375 inches (6.35 mm to 9.5 mm) thus preventing intimate contact between the sidewalls 48 and bottom panels 52 of adjacent containers 12, sticking together of the container 12 because of such intimate contact and thus difficulty in separating the containers 12 prior to machine filling.

Figure 5:
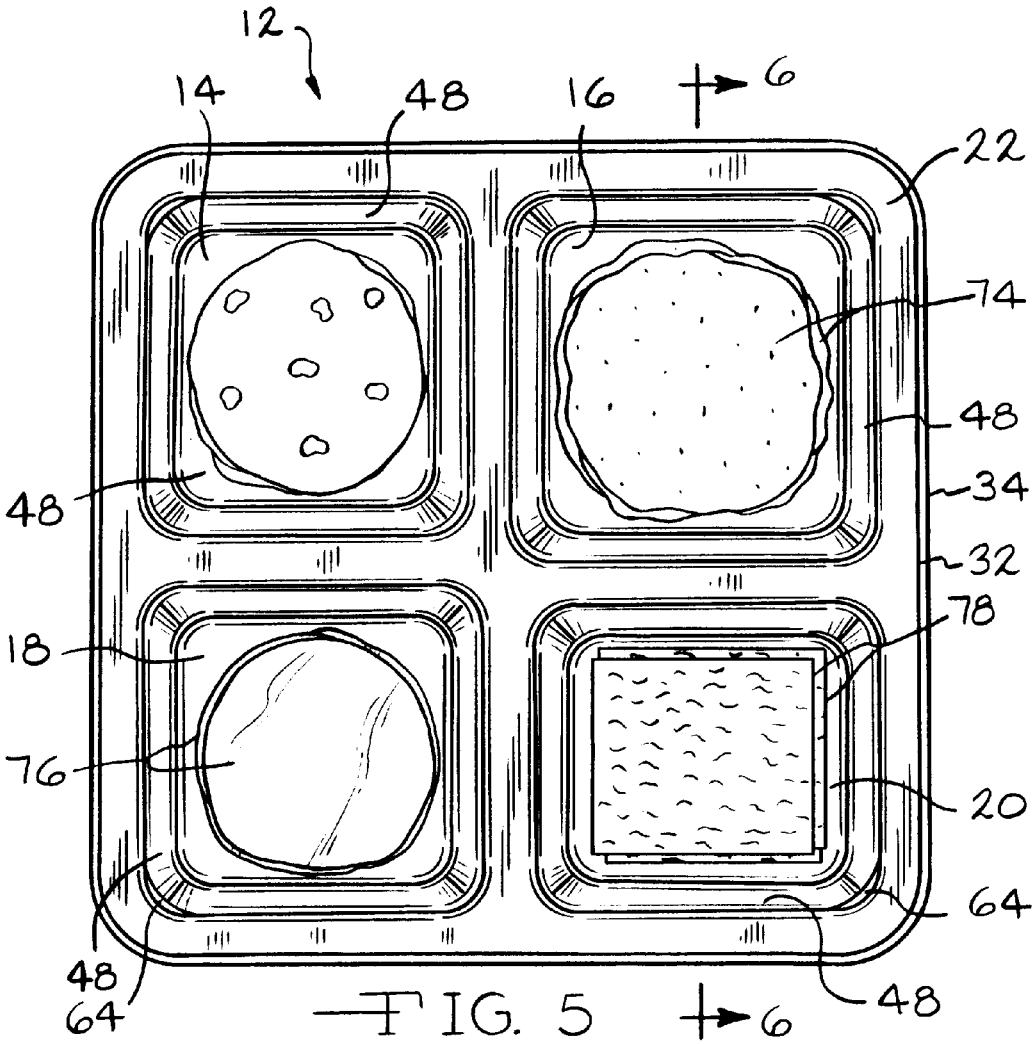
FIG. 5 is a top plan view of a compartmentalized food container according to the present invention.
Figure 6:
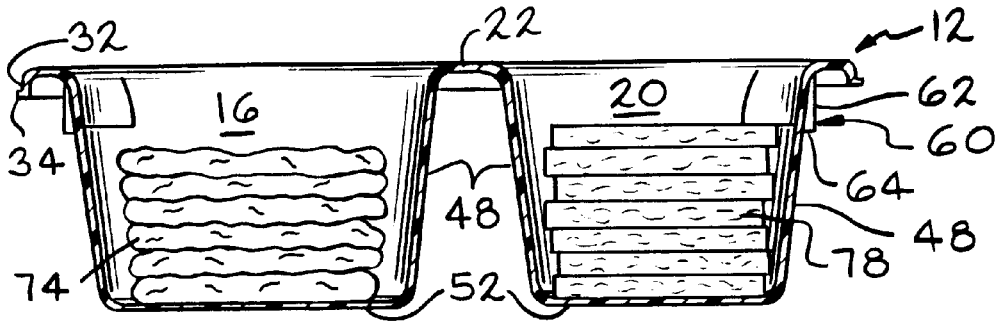
FIG. 6 is a full, sectional view of a compartmentalized food container according to the present invention taken along line 6—6 of FIG. 5.

Referring now to FIGS. 2, 5 and 6, it will be appreciated that the compartmentalized food package 10 according to the present invention provides isolated storage of diverse foodstuffs such as meat, cheese, crackers, nuts, cookies, candy, fruit and the like as well as provides substantially vertical self-display of the package without holes in the package and associated hanging type display fixtures. In this regard, the four chambers 14, 16, 18 and 20 are preferably filled with foodstuffs in a manner which contributes to the overall stability of the compartmentalized food package 10 in the vertical, self-displaying position illustrated in FIG. 2. Assuming the chambers 18 and 20 define the lower two chambers when the package 10 is displayed as illustrated in FIG. 2, these two chambers are preferably filled with the heavier foodstuffs, typically sliced meat 76 and cheese 78. It will be further appreciated that the chamber 18 is square as illustrated in the plan view of FIG. 5 and thus is readily adaptable to the receipt of meat 76 such as bologna, sausage and other cold meats which are typically round. The chamber 20, by way of contrast, is rectangular as illustrated in the plan view of FIG. 5 and is thus adapted to products such as slices of cheese 78 which are readily and typically formed or cut into rectangular or other desirable shapes. The lighter foodstuffs such as cookies 72 and crackers 74 are preferably disposed in the upper chambers 14 and 16 which are also square and thus readily receive round cookies 72 and crackers 74. For example, the chamber 14 which is the smaller of the two upper chambers is sized to accept cookies 72 whereas the larger chamber 16 is well suited for crackers 74.

As an example, the cookies 72 in the chamber 14 may have a net weight of approximately 0.75 ozs. (21.3 gms.) or will preferably be in the range of from 0.7 ozs. to 0.8 ozs. (19.9 gms. to 22.7 gms.). Similarly, the crackers 74 in chamber 16 will also be relatively light and preferably have a weight of about 0.7 ozs. (19.9 gms.) or be in the range from 0.6 ozs. to 0.8 ozs. (17.0 gms. to 22.7 gms.). By contrast, the heavier product such as the meat 76 disposed in chamber 18 will have a weight of about 1.4 ozs. (39.7 gms.) or in any event from about 1.2 ozs. to 1.6 ozs. (34 gms. to 45.4 gms.) and the cheese 78 in the chamber 20 will have a weight of about 1.35 ozs. (38.3 gms.) or in any event from about 1.2 ozs. to 1.6 ozs. (34 gms. to 45.4 gms.). The foregoing weights are given by way of example and may be readily and generally proportionally adjusted if the overall container 10 is larger or smaller than that disclosed.

As illustrated in FIG. 2, given such a disposition of foodstuffs in the package 10 the center of gravity, will be disposed at the point X as viewed from the side as in FIG. 2. The package 10 is thus stable as illustrated by the plumb line 82 descending from the center of gravity X. By way of contrast, if the package 10 is filled oppositely such that the heavier foodstuffs are disposed in the chambers 14 and 16 and the lighter foodstuffs are disposed in the lower chambers 18 or 20 (or the package 10 is placed on its side or upside down such that the chambers 14 and 16 are on the bottom, adjacent the supporting surface 80), the center of gravity will move to Y such that the package may be either marginally stable or unstable as illustrated by the fact that the plumb line 84 is outside the bottom edge of the package 10, thus defeating the self-displaying goal of the package 10.

The foregoing disclosure is the best mode devised by the inventor for practicing this invention. It is apparent, however, that products incorporating modifications and variations will be obvious to one skilled in the art of food packaging. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A compartmentalized food package comprising, in combination, a plastic container having a plurality of chambers, each of said chambers having an interior space and a mouth, said chambers defined by oblique sidewalls and a bottom panel, a unitary flange surrounding each of said chambers proximate said mouths and merging with said sidewalls, *a bottom edge defined by an intersecting oblique sidewall and a bottom panel, said intersecting oblique sidewall oriented at an angle of about 85° to said flange* and an edge substantially perpendicular to said flange, and a removably secured flexible plastic cover sealed to said flange about said chambers, whereby said plastic cover seals and isolates each of said plurality of chambers from other of said plurality of chambers.

2. The compartmentalized food package of claim 1 wherein said container includes four chambers.

3. The compartmentalized food package of claim 1 wherein said container includes four chambers each of said chambers and said interior spaces of said chambers define at least two distinct volumes.

4. The compartmentalized food package of claim 1 wherein said edge has a periphery and further including a lip extending about the periphery of said edge.

5. The compartmentalized food package of claim 4 wherein said lip is substantially parallel to said flange.

6. The compartmentalized food package of claim 1 wherein said plastic cover defines a periphery substantially aligned with said shoulder and further includes a tab extending beyond said shoulder.

7. The compartmentalized food package of claim 1 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.

8. The compartmentalized food package of claim 1 further including a plurality of spacers for limiting the extent of nesting of adjacent, aligned containers.

9. The compartmentalized food package of claim 1 further including a spacer disposed in sidewalls of at least two of said chambers, said spacers having a ledge disposed substantially [normal] *parallel* to and spaced from said flange for contacting a flange of an adjacent, nesting container to space said container from said adjacent container.

10. The compartmentalized food package of claim 9 wherein said ledge is a reference distance from said flange and said adjacent container is spaced from said container by said reference distance.

11. The compartmentalized food package of claim 1 wherein [intersection of said oblique sidewalls and said bottom panels of two of said plurality of chambers define a bottom edge and] said container will stand substantially upright on said edge and said bottom edge.

12. The compartmentalized food package of claim 1 wherein said unitary flange defines a plane.

13. A compartmentalized food package comprising, in combination, a plastic container having a plurality of chambers each defined by oblique sidewalls and a bottom panel, a flange surrounding each of said chambers and merging with said sidewalls, *said oblique sidewalls and said bottom panels of two of said plurality of chambers intersecting to define a bottom edge, said oblique sidewalls of said two said plurality of chambers oriented at an angle of about 85°* and a shoulder substantially perpendicular to said flange, a cover removably sealed to said flange about said chambers, and food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.

14. The compartmentalized food package of claim 13 further including a plurality of spacers formed in said sidewalls for limiting the extent of nesting of adjacent containers.

15. The compartmentalized food package of claim 13 wherein said plastic container is high density polyethylene and said cover assembly is a transparent plastic film.

16. The compartmentalized food package of claim 13 wherein said container includes two of said lower chambers in which said first food from said first group is disposed and two of said upper chambers in which said second food from said second group is disposed.

17. A compartmentalized food package comprising, in combination, a plastic container having a plurality of chambers, each of said chambers having an interior space and a mouth, said chambers defined by oblique sidewalls and a bottom panel, a unitary flange surrounding each of said chambers proximate said mouths and merging with said sidewalls, *a bottom edge defined by an intersecting oblique sidewall and a bottom panel, said intersecting oblique sidewall oriented at an angle of about 85° to said flange,* and an edge extending substantially perpendicular to said flange, a cover removably sealed to said flange about said chambers, whereby said plastic cover seals and isolates each of said plurality of chambers for other of said plurality of chambers, and a spacer disposed in said sidewalls of at least two of said chambers, said spacers having a ledge disposed substantially [normal] *parallel* to and spaced from said flange for contacting a flange of an adjacent, nesting container to space said container from said adjacent container.

18. The compartmentalized food package of claim 17 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.

19. The compartmentalized food package of claim 17 wherein intersection of said oblique sidewalls and said bottom panels of two of said plurality of chambers define a bottom edge and said container will stand substantially upright on said edge and said bottom edge.

*20. A compartmentalized food package comprising, in combination,*

*a plastic container having a plurality of chambers, each of said chambers having an interior space and a mouth, said chambers defined by oblique sidewalls and a bottom panel, a unitary flange surrounding each of said chambers proximate said mouths and merging with said sidewalls, said oblique sidewalls and said bottom panels of two of said plurality of chambers intersecting to define a bottom edge, said oblique sidewalls of said two of said plurality of chambers oriented at an angle of about 85° to said flange and an edge substantially perpendicular to said flange, and*

*a removably secured flexible plastic cover sealed to said flange about said chambers, whereby said plastic cover seals and isolates each of said plurality of chambers from other of said plurality of chambers.*

*21. The compartmentalized food package of claim 20 wherein said edge has a periphery and further including a lip extending about the periphery of said edge.*

*22. The compartmentalized food package of claim 20 wherein said plastic cover defines a periphery substantially aligned with said flange and further includes a tab extending beyond said flange.*

*23. The compartmentalized food package of claim 20 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.*

*24. The compartmentalized food package of claim 20 further including a plurality of spacers for limiting the extent of nesting of adjacent, aligned containers.*

*25. A compartmentalized food package comprising, in combination,*

*a plastic container having a plurality of chambers, each of said chambers having an interior space and a mojth, said chambers defined by oblique sidewalls and a bottom panel, a unitary flange surrounding each of said chambers proximate said mouths and merging with said sidewalls said oblique sidewalls and said bottom panels of two of said plurality of chambers intersecting to define a bottom edge, said oblique sidewalls of said two of said plurality of chambers oriented at an angle of about 85° to said flange and an edge substantially perpendicular to said flange,*

*a cover removably sealed to said flange about said chambers, whereby said plastic cover seals and isolates each of said plurality of chambers for other of said plurality of chambers, and*

*a spacer disposed in said sidewalls of at least two of said chambers, said spacers having a ledge disposed substantially parallel to and spaced from said flange for contacting a flange of an adjacent, nesting container to space said container from said adjacent container.*

*26. The compartmentalized food package of claim 25 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.*

*27. A self-displaying compartmentalized food package comprising, in combination,*

*a plastic container having a plurality of chambers, each of said chambers having an interior space and a mouth, said chambers defined by oblique sidewalls and a bottom panel, a unitary flange surrounding each of said chambers proximate said mouths and merging with said sidewalls, a bottom edge defined by an intersecting sidewall and a bottom panel, an edge substantially perpendicular to said flange, a lip extending outwardly from said edge which cooperates with said bottom edge to orient said plastic container so that a plumb line from a center of gravity of said food package passes between said lip and said bottom edge, and*

*a removable, secured flexible plastic cover sealed to said flange about said chambers, whereby said plastic cover*

*seals and isolates each of said plurality of chambers from other of said plurality of chambers.*

*28. The self-displaying compartmentalized food package of claim 27 further including a plurality of spacers formed in said sidewalls for limiting the extent of nesting of adjacent containers.*

*29. The self-displaying compartmentalized food package of claim 27 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.*

*30. The self-displaying compartmentalized food package of claim 27 wherein said container includes four chambers.*

*31. A self-displaying compartmentalized food package comprising, in combination,*

*a plastic container having a plurality of chambers, each of said chambers having an interior space and a mouth, said chambers defined by oblique sidewalls and a bottom panel, a unitary flange surrounding each of said chambers proximate said mouths and merging with said sidewalls, a bottom edge defined by an intersecting sidewall and a bottom panel, an edge substantially perpendicular to said flange, a lip extending outwardly from said edge and no additional components for facilitating substantially upright self-display,*

*a cover removably sealed to said flange about said chambers, and*

*a spacer disposed in said sidewalls of at least two of said chambers, said spacers having a ledge disposed substantially parallel to and spaced from said flange for contacting a flange of an adjacent, nesting container to space said container from said adjacent container.*

*32. A self-displaying compartmentalized food package of claim 31 further including food disposed in said chambers, said food including at least a first food selected from a first group including relatively dense, moisture laden foods and at least a second food selected from a second group including relatively lightweight, dry foods wherein said first food is disposed in a lower chamber and second food is disposed in an upper chamber whereby the package is stable when disposed in a substantially upright position on a horizontal surface.*

*33. A self-displaying compartmentalized food package of claim 31 wherein said cover defines a periphery substantially aligned with said unitary flange and further includes a tab extending beyond said unitary flange.*

* * * * *